(12) United States Patent
McAuliffe et al.

(10) Patent No.: US 7,433,141 B2
(45) Date of Patent: Oct. 7, 2008

(54) DATA RANDOMIZATION FOR REWRITING IN RECORDING/REPRODUCTION APPARATUS

(75) Inventors: Richard H. McAuliffe, Boulder, CO (US); Paul Newsome, Buderim (AU)

(73) Assignee: Tandberg Data Corporation, Boulder, CO (US)

( * ) Notice: Subject to any disclaimer, the term of this patent is extended or adjusted under 35 U.S.C. 154(b) by 369 days.

(21) Appl. No.: 11/074,937

(22) Filed: Mar. 9, 2005

(65) Prior Publication Data
US 2006/0203367 A1    Sep. 14, 2006

(51) Int. Cl.
G11B 20/10    (2006.01)
G11B 20/12    (2006.01)

(52) U.S. Cl. .............................. 360/39; 360/40; 360/53; 360/48; 714/771

(58) Field of Classification Search .................... 360/53, 360/40, 29, 39; 714/771, 701, 806
See application file for complete search history.

(56) References Cited

U.S. PATENT DOCUMENTS

| | | | | |
|---|---|---|---|---|
| 4,978,955 A | * | 12/1990 | Howell | 341/109 |
| 5,050,018 A | | 9/1991 | Georgis et al. | |
| 5,081,547 A | * | 1/1992 | Howell | 360/31 |
| 5,172,863 A | * | 12/1992 | Melone et al. | 239/211 |
| 5,191,491 A | | 3/1993 | Zweighaft | |
| 5,349,481 A | | 9/1994 | Kauffman et al. | |
| 5,369,641 A | * | 11/1994 | Dodt et al. | 714/702 |
| 5,712,863 A | * | 1/1998 | Gray | 714/806 |
| 5,815,514 A | | 9/1998 | Gray | |
| 5,991,911 A | | 11/1999 | Zook | |
| 5,999,354 A | * | 12/1999 | Shitara | 360/53 |
| 6,052,817 A | * | 4/2000 | Whaley | 714/769 |
| 6,134,072 A | | 10/2000 | Zweighaft | |
| 6,134,384 A | * | 10/2000 | Okamoto et al. | 386/116 |
| 6,174,144 B1 | * | 1/2001 | van Hamme et al. | 417/383 |
| 6,246,551 B1 | | 6/2001 | Blatchley et al. | |
| 6,307,701 B1 | | 10/2001 | Beavers et al. | |

(Continued)

FOREIGN PATENT DOCUMENTS

EP    1 246 951 A1    11/2002

OTHER PUBLICATIONS

Tandberg SLR Tandberg SLR7, SLR50, SLR60, SLR75, SLR100 and SLR140 Reference Manual, Tandberg Data ASA, Oct. 2003.

(Continued)

*Primary Examiner*—Hoa T. Nguyen
*Assistant Examiner*—Dismery Mercedes
(74) *Attorney, Agent, or Firm*—Nixon & Vanderhye, P.C.

(57) ABSTRACT

A data recording/recovery device (20) comprises a packet generator (34) for including recordable information into a packet (44), the packet initially having a nominal run length limited (RLL) sequence if it were RLL encoded. A randomizer (38) uses a randomizer input value (50) to obtain a modified packet (46) which, when encoded, will at least partially have a different run length limited sequence than the nominal run length limited sequence. A write channel (40) records the modified packet (46) as a track packet at a destination physical location (42) on a storage medium (22). The randomizer input value (50) used to obtain the modified packet (46) is related to a predetermined physical location on the storage medium. In one example embodiment the randomizer input value is related to the destination physical location on the storage medium.

20 Claims, 12 Drawing Sheets

U.S. PATENT DOCUMENTS

| | | |
|---|---|---|
| 6,308,298 B1 * | 10/2001 | Blatchley et al. ............ 714/775 |
| 6,363,512 B2 | 3/2002 | Gray |
| 6,367,047 B1 * | 4/2002 | McAuliffe et al. .......... 714/755 |
| 6,367,048 B1 | 4/2002 | McAuliffe et al. |
| 6,381,706 B1 * | 4/2002 | Zaczek .......................... 714/5 |
| 6,392,829 B1 * | 5/2002 | Stoutenburgh et al. ........ 360/39 |
| 6,421,805 B1 | 7/2002 | McAuliffe et al. |
| 6,587,977 B1 * | 7/2003 | Riggle et al. ................ 714/701 |
| 6,597,526 B1 * | 7/2003 | Gray .......................... 360/40 |
| 6,603,618 B1 * | 8/2003 | McAuliffe et al. ............ 360/51 |
| 6,637,048 B1 * | 10/2003 | Lorch et al. .................... 4/615 |
| 6,714,144 B1 * | 3/2004 | Reed et al. .................... 341/50 |
| 7,158,058 B1 * | 1/2007 | Yu ................................ 341/58 |
| 2001/0052101 A1 | 12/2001 | Gray |
| 2003/0001036 A1 * | 1/2003 | Beavers et al. ........... 242/334.5 |

OTHER PUBLICATIONS

International Search Report and Written Opinion mailed May 18, 2007 in corresponding PCT application PCT/US06/00719.

* cited by examiner

LOCAL PACKET ADDRESS WORD 0 DEFINITION

| 15 | 14 | 13 | 12 | 11 | 10 | 9 | 8 | 7 | 6 | 5 | 4 | 3 | 2 | 1 | 0 | Description |
|---|---|---|---|---|---|---|---|---|---|---|---|---|---|---|---|---|
| | | SEG[5:0] | | | | | ROW[4:0] | | | | COLUMN[4:0] | | | | | Data Packets |
| 1 | 1 | SEG[5:0] | | | | | 0 | 0 | 0 | Q | ROW[4:0] | | | | | Row ECC Pkts |
| 1 | 1 | SEG[5:0] | | | | | 0 | 0 | 1 | Q | ROW[4:0] | | | | | Column ECC Pkts |
| 1 | 1 | SEG[5:0] | | | | | 0 | 1 | 0 | Q | ROW[4:0] | | | | | Diagonal ECC Pkts |
| 1 | 1 | 1 | 1 | 1 | 1 | CP_SEED[6:0] | | | | | | | | S | Q | Special ECC Pkts |
| 1 | 1 | 1 | 1 | 1 | 1 | CP_SEED[6:0] | | | | | | CP_TYPE[4:0] | | | | Control Packets |

Fig. 10A

LOCAL PACKET ADDRESS WORD 1 DEFINITION

| 15 | 14 | 13 | 12 | 11 | 10 | 9 | 8 | 7 | 6 | 5 | 4 | 3 | 2 | 1 | 0 | Description |
|---|---|---|---|---|---|---|---|---|---|---|---|---|---|---|---|---|
| TRACK_NUMBER[15:1] | | | | | | | | | | | | | | | RAN | |

Fig. 10B

LOCAL PACKET ADDRESS WORD 2 DEFINITION

| 15 | 14 | 13 | 12 | 11 | 10 | 9 | 8 | 7 | 6 | 5 | 4 | 3 | 2 | 1 | 0 | Description |
|---|---|---|---|---|---|---|---|---|---|---|---|---|---|---|---|---|
| RW[1:0] | | BUF[4:0] | | | | | PHYSICAL_PACKET[8:0] | | | | | | | | | Data Packets |
| SE | CP_SEED[12:7] | | | | | | PHYSICAL_PACKET[8:0] | | | | | | | | | Control Packets |

Fig. 10C

DATA RANDOMIZATION FOR REWRITING IN RECORDING/REPRODUCTION APPARATUS

BACKGROUND

1. Field of the Invention

The present invention pertains to recording and recovery of information on a storage medium, and particularly to apparatus and methods of counteracting recovery problems possibly resulting from consequences of run length limited (RLL) encoding.

2. Related Art and Other Considerations

Data storage devices, which are used in both short- and long-term capacities, are an integral part of modern computer systems. While factors such as costs, device form factor, storage media size and capacity, and recording and recovery times are of high importance, of primary concern is the ability to maintain data integrity.

Accordingly, many tape drives include a check-after-write scheme whereby data is verified by a read head as the data is recorded onto the tape. For example, in a helical scan tape drive, in which data is written in tracks in an alternate-azimuth helical pattern by a pair alternate azimuth adjacent write heads mounted on a rotating drum, the newly recorded data is verified half a drum rotation later by a pair of alternate azimuth read heads located 180 degrees relative to the pair of write heads. Examples of sophisticated helical scan recording/reproducing are found in the following (all of which are incorporated by reference in their entirety): U.S. Pat. No. 6,367,047 to McAuliffe et al.; U.S. Pat. No. 6,367,048 to McAuliffe et al.; U.S. Pat. No. 6,603,618 to McAuliffe et al.; and U.S. Pat. No. 6,381,706 to Zaczek; U.S. Pat. No. 6,421,805 to McAuliffe et al.; U.S. Pat. No. 6,308,298 to Blatchley et al.; U.S. Pat. No. 6,307,701 to Beavers et al.; and, U.S. Pat. No. 6,246,551 to Blatchley et al.

Whenever a check-after-write (CAW) failure occurs, in some drives the write operation is suspended and the tape is repositioned backwards to allow enough space to accelerate again to the forward operating speed, and the track containing the "failed" data is overwritten by a new track on which the "failed" data is attempted to be rewritten. The failed data had to be rewritten before data which followed it in address sequence could be recorded onto the tape due to the format requirement calling for recording in-sequence.

The prior art backhitching sequence for rewriting "bad" data is problematic. First, the time required for a backhitching cycle increases data recording time and delays the host system by causing an interruption if data from the host had achieve a maximum throughput "streaming" mode. In addition, because backhitching induces extremely high transient forces that greatly increase tape wear and reduce the mechanical reliability of the drive, the backhitch operation can seriously impact data reliability.

The backhitching sequence can be avoided by simply rewriting tracks that contain "bad" data further down the tape without stopping the process. However, this methodology has the disadvantage that if the rewrite count is high, a significant portion of the tape is occupied by duplicate tracks containing mainly redundant "good" data, thereby reducing the storage capacity of the tape.

Techniques for rewriting data that was considered bad or problematic after a check after write operation are described in one or more of the following: U.S. Pat. No. 5,050,018 to Georgis; U.S. Pat. No. 5,191,491 to Zweighaft; U.S. Pat. No. 5,349,481 to Kauffman et al.; U.S. Pat. No. 6,134,072 to Zweighaft; and U.S. Pat. No. 6,381,706 to Zaczek, all of which are incorporated herein by reference.

Data recorded on a storage medium is typically run length limited (RLL) encoded, e.g., by a (0,6) RLL code, for example. RLL is a data encoding method where data bits are encoded so that certain constraints are met with regard to the maximum and minimum distances between flux transitions. Thus, encoding provides a specific sequence of ones and zeroes over a specific time period. When looked at in the frequency domain, several RLL sequences have different frequency content.

When a packet of data is recorded on a storage medium, the frequency content is dependent on the data encoding technique and the actual user data content of the packet. In certain cases, the frequency content of the resulting write signal may create a low probability that the packet can be read back successfully. Packets with this characteristic can thus be considered as problematic packets. This is because rewriting a problematic packet the exact same way will have a low probability of being read successfully during a check after write operation.

The problematic packet conflicts with the perfect packet check after write requirement since some packets will never pass the check after write process regardless of how many times they are recorded. This may create a situation in which a write session will never be successfully completed when a problematic packet is encountered.

It is known in the prior art, prior to the recording of data on the storage medium, to modify the coded characters using a special randomizer circuit. The randomizer typically employs a data randomizer algorithm expressed as a generator polynomial. Examples of data randomization prior to encoding including U.S. Pat. No. 5,991,911 to Zook; U.S. Pat. No. 5,815,514 to Gray; and U.S. Pat. No. 6,363,512 to Gray.

What is needed, therefore, and an object of the present invention, is a technique for increasing the probability that a problematic packet will successfully pass a check after write process on one or more subsequent rewrites.

BRIEF SUMMARY

A data recording/recovery device comprises a packet generator for including recordable information into a packet, the packet initially having a nominal run length limited (RLL) sequence if it were RLL encoded. A randomizer uses a randomizer input value to obtain a modified packet when, when encoded, will at least partially have a different run length limited sequence than the nominal run length limited sequence. A write channel records the modified packet as a track packet at a destination physical location on a storage medium. The randomizer input value used to obtain the modified packet is related to a predetermined physical location on the storage medium. In one example embodiment the randomizer input value is related to the destination physical location on the storage medium.

According to an aspect of the technology, as a check or precaution a read channel attempts to recover or read back the track packet (the recorded modified packet) after the track packet has been recorded on the storage medium at the destination physical location. As part of the read back operation, a check is performed to determine whether the track packet recorded on the storage medium passes a check-after-write test. If the test is not passed, a differently modified packet corresponding to the packet is recorded at an additional destination physical location. In conjunction with recording at the additional destination physical location, the randomizer input value utilized by the randomizer for obtaining the differently modified packet is related to the additional destination physical location whereby the differently modified packet has a different run length limited sequence than the previously recorded modified packet. Since the differently modified packet has a different run length limited sequence than the previously recorded modified packet, any difficulties involved in recording or recovering the packet that may be attributable to or dependent upon the particular run length limited sequence are counteracted. This increases opportunity for recovery of the packet in a check after write process.

In an example, non-limiting embodiment in which the storage medium is magnetic tape, the randomizer input value for the modified packet is at least partially derived from a track number corresponding to a destination physical track and is at least partially derived from a physical packet number corresponding to a destination physical packet location on the destination physical track. The storage medium can be, as a non-limiting example, magnetic tape upon which tracks are recorded in helical fashion.

As another aspect of the technology, the packet generator can optionally include in the packet a randomization strategy indicator for designating which one of plural techniques is to be used by the randomizer for reconfiguring the randomizer input value. The randomizer then reconfigures the randomizer input value in accordance with a designated technique corresponding to the randomization strategy indicator.

In the example implementation context of a tape drive, the plural techniques reflected by the randomization strategy indicator can differ by using a different concatenation of at least part of a track number corresponding to a destination physical track and at least part of a physical packet number corresponding to a destination physical packet location on the destination physical track.

As another aspect of the technology, the randomization strategy indicator can have a value which depends on a reason for recording the packet on the storage medium. For example, the randomization strategy indicator can have a first value when the packet is recorded as a virgin packet and another value when the packet is recorded as a rewritten packet. As a further illustrative example, the randomization strategy indicator can have a second value when the packet is recorded as a normally rewritten packet; a third value when the packet is recorded as a fill packet when further data is not currently available; and, a fourth value when the device is in a mode of continuously rewriting the packet until it is successfully read.

As another aspect of the technology, when it is discovered that a particular packet has been rewritten to the storage medium has failed the check after write test a predetermined number of times, the data recording/recovery device records enters a mode of continuously rewriting the packet (e.g., on the same track) until it is successfully read.

Other aspects of the technology concern methods which encompass one or more of the foregoing. Example, basic steps included in such methods entail including recordable information in a packet; using a randomizer input value for modifying a run length limited sequence of at least a portion of the packet to obtain a modified packet; recording the modified packet at a destination physical location on a storage medium; and, configuring the randomizer input value to be related to a predetermined physical location on the storage medium, as above summarized by way of example.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 10A, FIG. 10B, and FIG. 10C are diagrammatic views depicting contents of first, second, and third words, respectively, of a local packet address field of a packet.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1A:
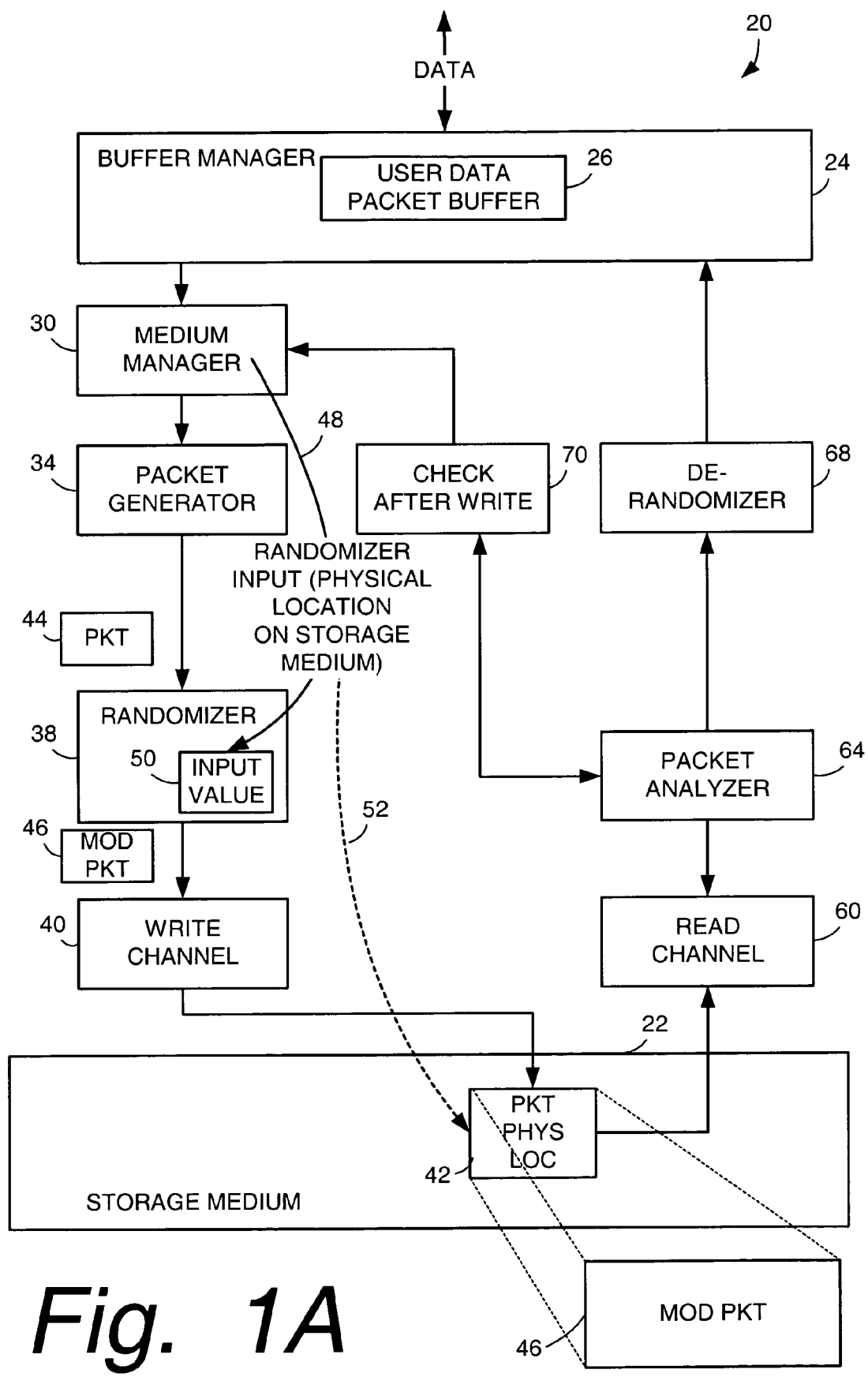
FIG. 1A and FIG. 1B are schematic views of a data recording/recovery device according to a first example embodiment, with FIG. 1A illustrating, e.g., an initial recording of a packet at a first physical location and FIG. 1B illustrating, e.g., re-recording of a packet at a second physical location.

FIG. 1A shows an example data recording/recovery device 20 which advantageously enhances recovery opportunities for packets stored on a storage medium 22. The data recording/recovery device 20 comprises a buffer manager 24 which governs storage, retrieval, and possibly (to some extent) manipulation of user data packets initially obtained from a host device and stored in a user data packet buffer 26.

In its broad aspects, the storage medium 22 is not limited to any particular type of medium. Such being the case, storage medium 22 can be magnetic tape (having tracks of any orientation and/or format, such as longitudinal or helical, for example), disk (magnetic or optical), or any other suitable medium. Moreover, as utilized in its broadest aspects herein, the term "packet" can include any type of reasonable grouping of data, such as data blocks, for example.

As shown in FIG. 1A, on its "recording" or "write" side, the data recording/recovery device 20 further comprises, among other possible functional units, medium handler 30; packet generator 34; randomizer 38; and, write channel 40. Basic example, non-limiting steps or events associated with various aspects of a recording or write operation are depicted in FIG. 2A.

The medium handler 30, among other functions, keeps tracks of the utilization of storage medium 22. In this regard, for each packet which is to be recorded on storage medium 22, medium handler 30 determines a target or destination physical location on storage medium 22 at which the packet is to be recorded. For an example user data packet obtained from user data packet buffer 26 for which a corresponding packet is to be recorded on storage medium 22, assume that medium handler 30 determines that the recorded packet is to occupy physical location 42 on storage medium 22.

Figures 2A, 2B:
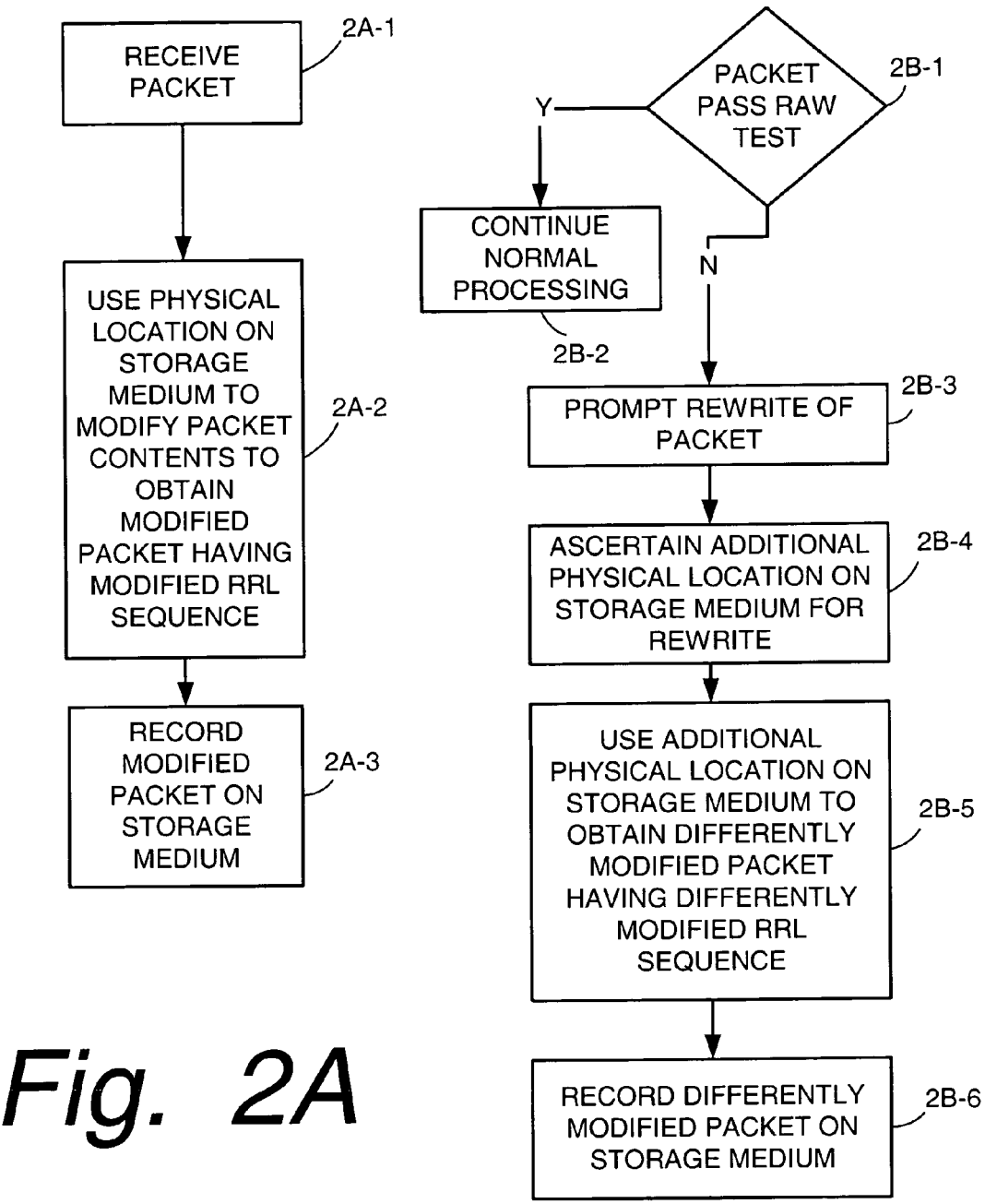
FIG. 2A is a flowchart showing basic example, non-limiting steps or events associated with various aspects of a recording or write operation of the first example embodiment.
FIG. 2B is a flowchart showing basic example, non-limiting steps or events performed by the first example embodiment in conjunction with certain aspects resulting from its check-after-write operation.

As depicted by step 2A-1 of FIG. 2A, packet generator 34 obtains or receives a user data packet from user data packet buffer 26 and generates an initial version of a packet which is to be recorded on the storage medium. Thus, packet generator 34 includes recordable information, e.g., obtained from user data packet buffer 26, into a packet such as packet (PKT) 44 depicted in FIG. 1A. As generated, if applied to a run length limited (RLL) encoder, the packet 44 would have a nominal RLL sequence, e.g., a nominal or initial sequence of ones and zeros which substantially reflects, e.g., the content of user data included in packet 44.

Rather than record packet 44 on storage medium 22 with an RLL sequence that essentially purely reflects its data content, as step 2A-2 the data recording/recovery device 20 employs randomizer 38 to generate a modified packet, depicted in FIG. 1A as modified packet (MOD PKT) 46. In particular, as step 2A-2 the randomizer 38 uses a randomizer input value for modifying at least a portion of packet 44 so that the run length limited sequence of the modified packet 46 will differ from the nominal or initial sequence of ones and zeros which would have resulted from the nominal RLL sequence of packet 44. Thus, at least in the sense that it modifies the content of at least a portion packet 44, randomizer 38 uses the randomizer input value for modifying a run length limited sequence of at least a portion of packet 44 to obtain modified packet 46. In an example implementation in which a portion of the packet 44 is modified by randomizer 38, the portion so modified can be (for example) a user data portion.

The randomizer input value utilized by randomizer 38 is related to a predetermined physical location on the storage medium, and preferably is the destination physical location 42. Arrow 48 shows randomizer input value 50 (being indicative of the predetermined physical location on the storage medium) as being forwarded to randomizer 38 from medium handler 30. Broken arrow 52 shows the correspondence of the randomizer input value 50 to the destination physical location 42 on storage medium 22.

Figure 3:
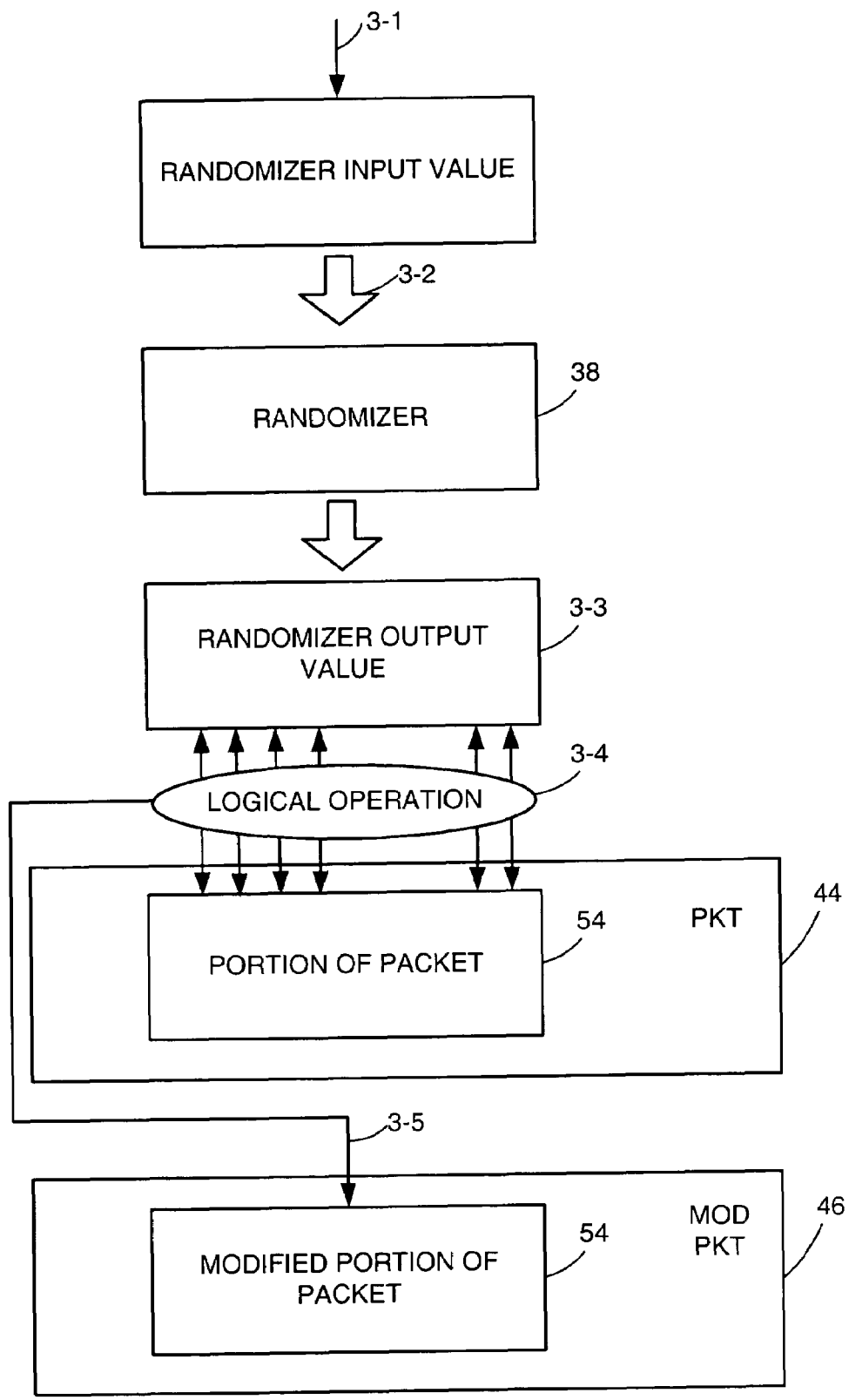
FIG. 3 is a diagrammatic view depicting various basic, representative steps of an example technique of for using a randomizer input value for generating a modified packet.

FIG. 3 shows basic, representative steps of an example technique of randomizer 38 using the randomizer input value 50 for generating a modified packet 46. Step 3-1 shows randomizer 38 receiving the randomizer input value 50 which, as mentioned before, is related to a predetermined physical location on the storage medium, and preferably is the destination physical location 42. As step 3-2, the randomizer input value 50 is input to randomizer 38. The randomizer 38 can use any suitable polynomial for its randomization. Step 3-3 shows output from randomizer 38. Step 3-4 shows a logical operation using the output (step 3-3) from the randomizer 38 and at least a portion 54 of packet 44. The portion 54 of packet 44 is preferably, but not necessarily, a user data portion of packet 44. The logical operation performed as step 3-4 can be, for example, an exclusive or (XOR) operation of corresponding bits of the randomizer output of step 3-3 and the portion 54 of packet 44. The logical operation can be performed on a word-by-word or other suitable basis with respect to portion 54 of packet 44. As step 3-5, the logical operation results are inserted in a portion 56 of modified packet 46, the portion 56 of modified packet 46 essentially corresponding in bit positions to portion 54 of packet 44.

While various example embodiments described herein may show randomizer 38 as being a distinct unit or functionality, it should be understood that the functionality of randomizer 38 can be included in other units or combined with other functionalities, such as included in packet generator 34, for example. The same is true of other units and functionalities illustrated and discussed herein.

As step 2A-3, the write channel 40 records the modified packet 46 as a "track packet" at the destination physical location 42 on storage medium 22. The write channel 40 can comprise various elements and/or recording functionalities well known to the person skilled in the data recording art, such as (for example) various circuits and elements including a RLL modulator, a parallel-to-serial converter, and write current modulator. The write channel 40 uses recording elements in the form of, for example, heads, transducers, gaps, or other suitable means to record or write the modified packet 46 to destination physical location 42 on storage medium 22. One or more such recording elements may be provided for essentially simultaneously recording plural packets to plural recording paths (e.g., stripes, sectors, etc.).

It will be appreciated, particularly in view of subsequently illustrated example embodiments, that error detection and/or error recovery information of one or more various types, e.g., CRC or ECC, may be included in the modified packet 46 as it is recorded as a track packet. Such error detection and/or error recovery information may be developed and inserted, e.g., by packet generator 34, in which case the error detection and/or error recovery information is not operated upon by randomizer 38. The actual track packet may also be otherwise embellished or augmented.

On its "read" or "recovery" side, data recording/recovery device 20 comprises read channel 60; packet analyzer 64; de-randomizer 68; and, check-after-write (CAW) functionality or processor 70. The read channel 60 can comprise various elements and/or reproducing functionalities well known to the person skilled in the data recording art, such as (for example) various circuits and elements including data pattern and clock recovery circuitry, a serial-to-parallel converter, and, an RLL demodulator. In correspondence to write channel 40, read channel 60 uses one or more reproducing elements in the form of, for example, heads, transducers, gaps, or other suitable means to read or reproduce the modified packet 46 from destination physical location 42 on storage medium 22.

The packet analyzer 64 analyzes, parses, or deformats packets obtained from storage medium 22 via read channel 60. In a read or reproduction operation, such analysis is preparatory to ultimate storage of versions of the reproduced packets in user data packet buffer 26. The de-randomizer 68 is able to perform a de-randomizing operation since de-randomizer 68 knows the physical location on the storage medium associated with the modified packet obtained by the read channel 60.

In conjunction with a write or record operation, the read side of the data recording/recovery device 20 attempts to recover or read back the modified packet after the modified packet 46 has been recorded on the storage medium at the destination physical location 42, as a check or precaution that the modified packet can be recovered subsequently during another reproduction operation. To this end, check-after-write processor 70 ascertains in timely fashion if a packet from user data packet buffer 26 which was commissioned for recording has not been reproduced from storage medium 22. Various techniques of performing such a check-after-write test are known, such as techniques disclosed in various references earlier cited. Check-after-write processor 70 may interact with user data packet buffer 26 through buffer manager 24 in this determination and/or obtain from packet analyzer 64 an indication whether the packet obtained from storage medium 22 was either properly recorded on or correctly reproduced from storage medium 22. Such information obtained from packet analyzer 64 can be, for example, CRC or ECC information as previously alluded.

FIG. 2B illustrates basic, example, non-limiting events or steps performed by data recording/recovery device 20 in conjunction with certain aspects resulting from its check-after-write operation. Thus, as step 2B-1 the check-after-write processor 70 determines whether the modified packet recorded on the storage medium passes a check-after-write test. If the test is passed, processing or check-after-write of other packets (e.g., normal processing) is performed (step 2B-2). On the other hand, if the test administered by check-after-write (CAW) functionality or processor 70 is not passed, as step 2B-3 check-after-write processor 70 prompts causes rewriting or recording of the user data content the of modified packet, but at another location on data recording/recovery device 20.

Figure 1B:
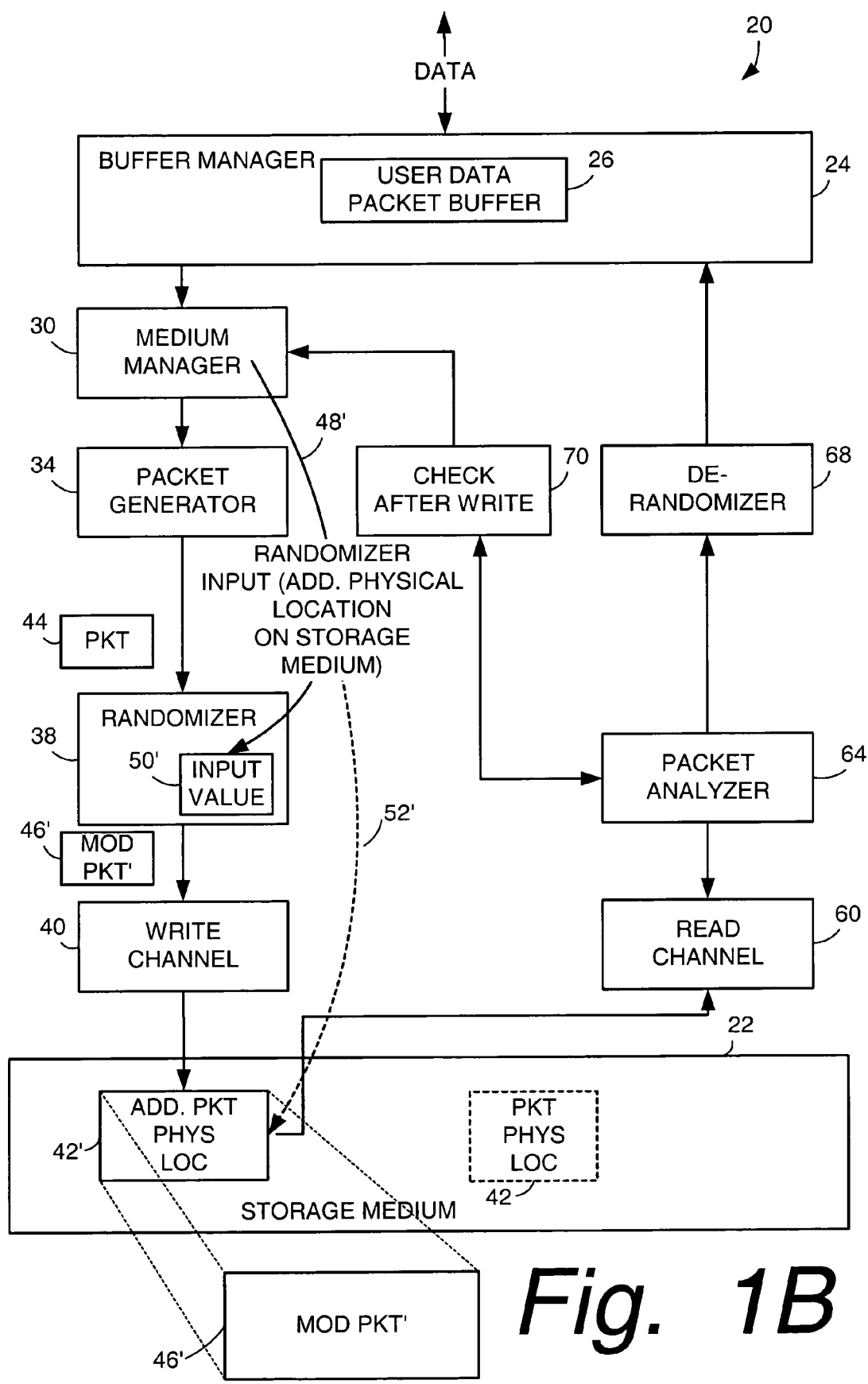

In particular, as step 2B-3 the check-after-write processor 70 requests that the contents of the previously commissioned (but not yet successfully reproduced) packet be again applied to medium handler 30 as a "re-requested" packet. Then, as shown in FIG. 1B (which reflects a point in time subsequent to FIG. 1A) and step 2B-4 of FIG. 2B, medium handler 30 ascertains an additional destination physical location 42' at which the re-requested packet is to be rewritten. The additional destination physical location 42' is transmitted or applied to randomizer 38 as depicted by arrow 48 for use as randomizer input value 50'. The randomizer 38 thus has a different randomizer input value for the re-requested packet than its initial version, and thus (as step 2B-5) produces, generates, or obtains a packet which is differently modified from the modified packet previously obtained and ultimately stored at destination physical location 42. Thus, in handling the re-requested packet with a different randomizer input value 50 corresponding to a different destination physical location 42', the randomizer 38 generates a differently modified packet 46' which will have a run length limited (RLL) sequence which differs from the run length limited (RLL) sequence from the related predecessor packet which was earlier recorded at destination physical location 42.

Thus, as shown in FIG. 1B and step 2B-6 of FIG. 2B, a differently modified packet corresponding to the original packet is recorded at additional destination physical location 42'. In conjunction with recording at the additional destination physical location 42', the randomizer input value 50' utilized by the randomizer for obtaining the differently modified packet is related to the additional destination physical location 42' whereby the differently modified packet 46' has a different run length limited sequence than the previously recorded modified packet. Since the differently modified packet 46' has a different run length limited sequence than the previously recorded modified packet 46, any difficulties involved in recording or recovering the packet that may be attributable to or dependent upon the particular run length limited sequence may be counteracted.

Figure 4:
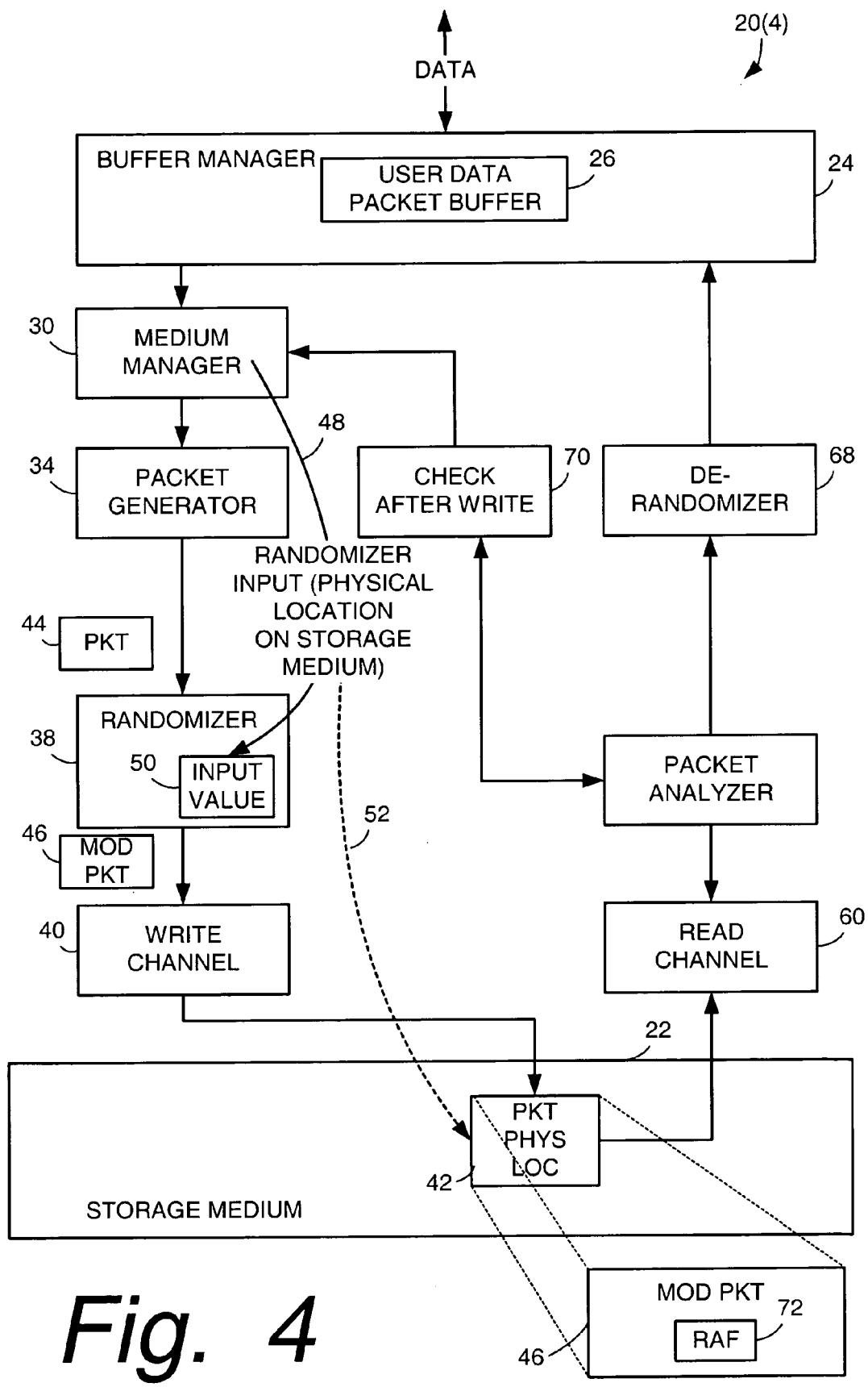
FIG. 4 is a schematic view of a data recording/recovery device according to a second example embodiment.
Figure 5:
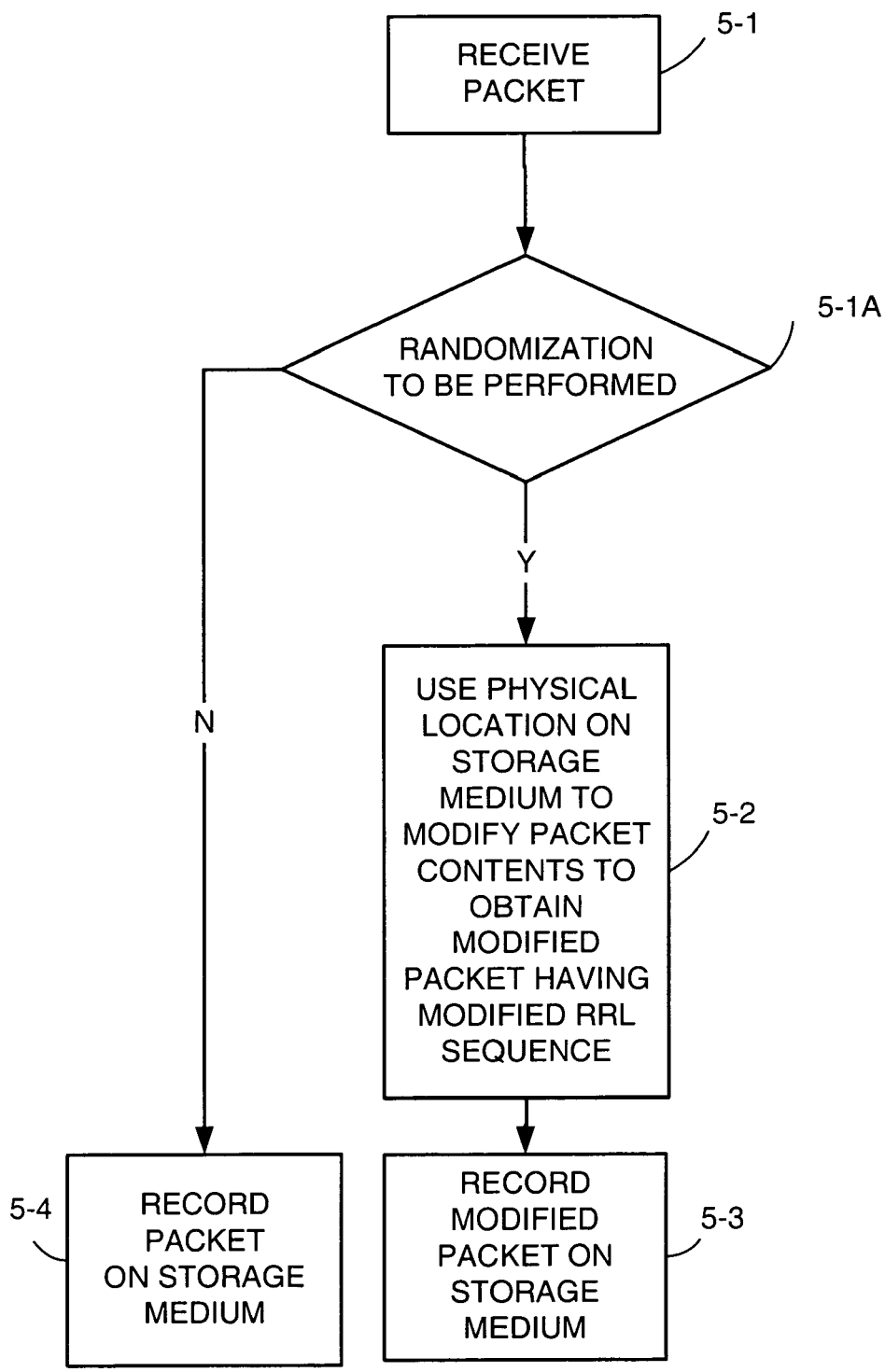
FIG. 5 is a flowchart showing basic example, non-limiting steps or events associated with various aspects of a recording or write operation of the second example embodiment.

In a second example embodiment illustrated in FIG. 4, the randomization of the first embodiment is selectively activated or performed. In this regard, FIG. 5 illustrates basic, example steps performed by a second example embodiment data recording/recovery device 20(4) of FIG. 4. The steps of FIG. 5 are essentially the same as those of correspondingly suffixed steps of FIG. 2A, with the primary exception of inclusion of an additional step 5-1A and an additional step 5-4. At step 5A-1, a check is made whether the randomization of the first embodiment is selectively activated or to be performed. If not, as step 5-4 the packet is essentially recorded to tape (without randomization, but perhaps with other types of packet processing being performed). If the randomization of the first embodiment is selectively activated or to be performed, the ensuing steps are similar to those described in FIG. 2A.

The second embodiment of FIG. 4 also shows inclusion by packet generator 34 of a randomization activation flag (RAF) 72 in the modified packet 46 as recorded on storage medium 22. By including the randomization activation flag (RAF) 72 in modified packet 46, the reproduction side of data recording/recovery device 20 knows whether to perform de-randomization with respect to the modified packet upon recovery or read back. The randomization activation flag (RAF) 72 may be particularly useful for bypassing randomization during certain operations, such as debugging, for example.

Figure 6:
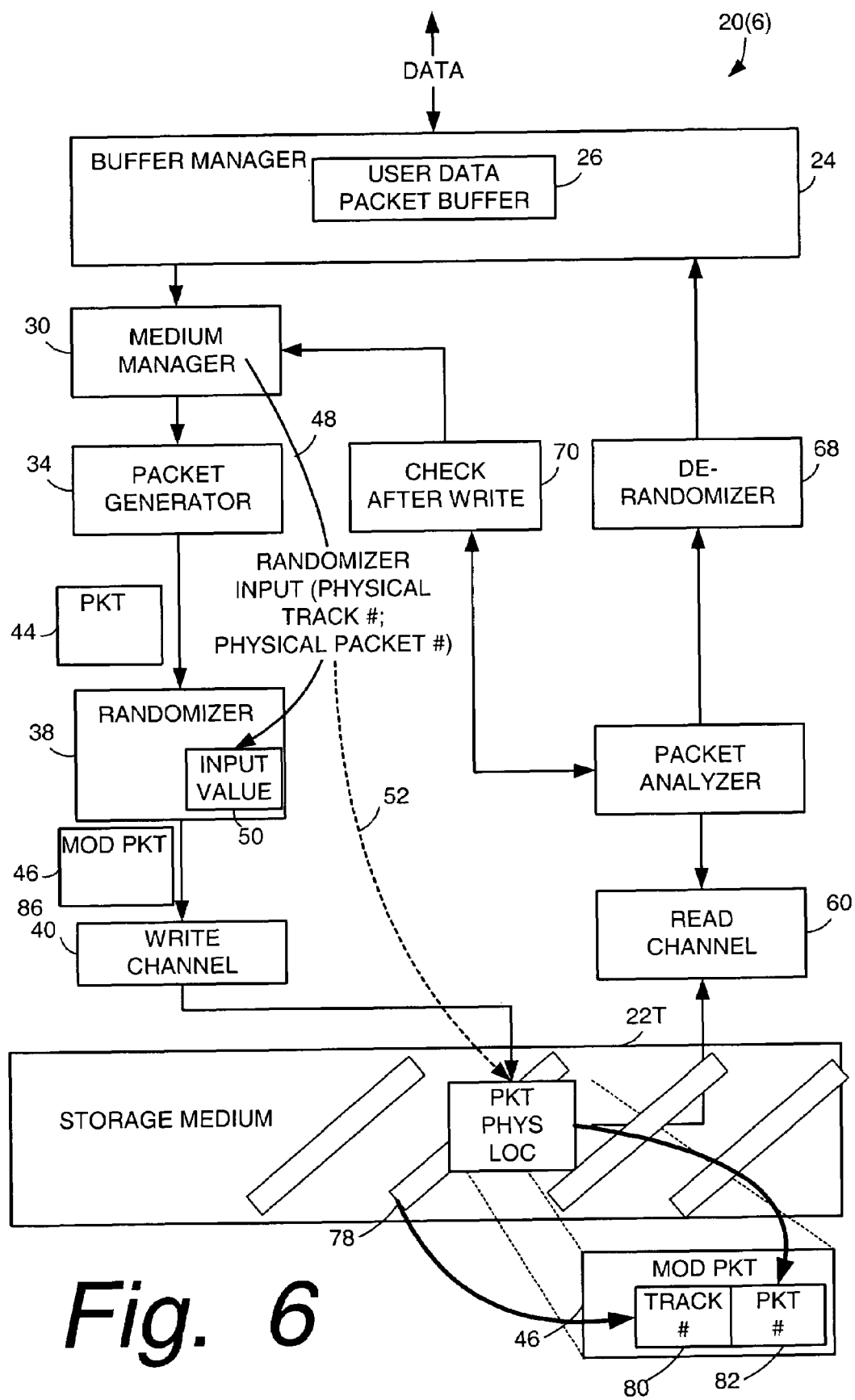
FIG. 6 is a schematic view of a data recording/recovery device according to a third example embodiment when the storage medium is magnetic tape.

FIG. 6 shows a third example, non-limiting embodiment in which the storage medium takes the form of magnetic tape 22T, and thus data recording/recovery device 20(6) is a tape drive. For the particular example implementation of FIG. 6, storage medium 22T is helically striped track, for which reason helical tracks 78 are illustrated on storage tape 22T. The helical tracks 78 are not shown properly spaced, but rather for convenience in a manner to reflect simply the nature of helical recording generally. It should be appreciated that, in other implementations, the tracks or stripes recorded on tape 22T can be formed otherwise, such as longitudinal or serpentine tracks, for example, Moreover, the storage tape 22T can be any particular format, of which 8 mm is but one non-limiting example.

In the third example embodiment of FIG. 6, the randomizer input value 50 for the modified packet can be at least partially derived from two factors. First, the randomizer input value for the modified packet can be at least partially derived from a track number corresponding to a destination physical track. Secondly, the randomizer input value for the modified packet can be at least partially derived from a physical packet number corresponding to a destination physical packet location on the destination physical track.

As an optional feature or aspect of the third example embodiment, FIG. 6 further shows that the track number corresponding to the destination physical track and the physical packet number corresponding to a destination physical packet location on the destination physical track can be included in the modified packet 46 as recorded on tape 22T. For example, FIG. 6 shows the track number corresponding to the destination physical track as being stored in a track number field 80 and the physical packet number corresponding to a destination physical packet location on the destination physical track as being stored in a packet number field 82. The destination physical packet location can represent the sequential order of the packet on the track, e.g., the $20^{th}$ packet, for example.

It will be understood that in other non-tape embodiments, physical locators other than track number and packet number can be utilized, e.g., track number and sector number, for example.

Figure 7:
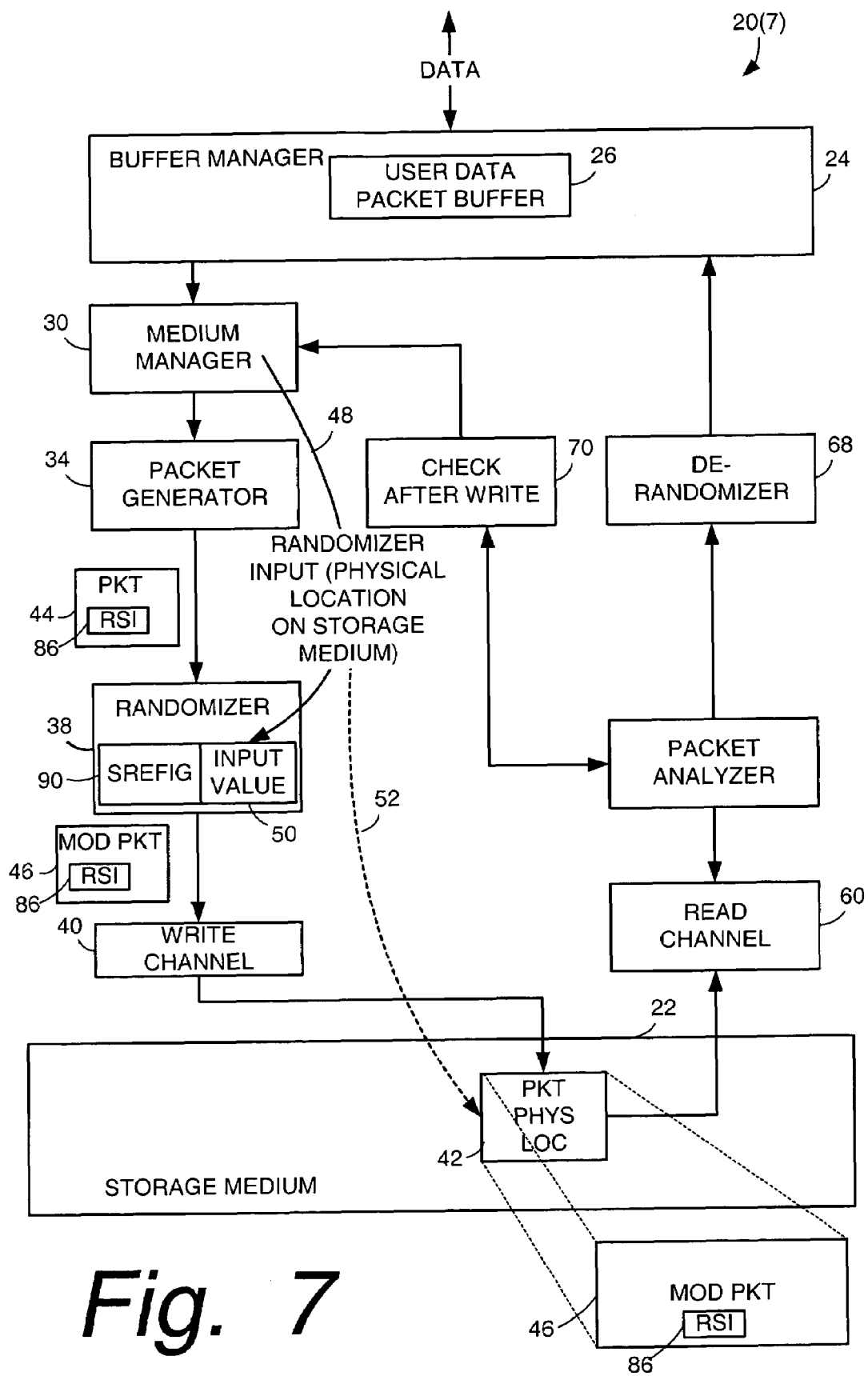
FIG. 7 is a schematic view of a data recording/recovery device according to a fourth example embodiment having, e.g., a seed selection strategy for its randomizer.

FIG. 7 shows a third example, non-limiting embodiment of a data recording/recovery device 20(7) having, e.g., a seed selection strategy for its randomizer. In the embodiment of FIG. 7, the packet generator 34 can optionally include in the packet 44 a randomization strategy indicator (RSI) 86 for designating which one of plural techniques is to be used by randomizer 38 for configuring the randomizer input value. The randomizer includes a seed reconfigurator (SREFIG) 90 which then reconfigures or otherwise modifies the randomizer input value 50 in accordance with a designated technique corresponding to the randomization strategy indicator (RSI) 86. For recovery purposes, the randomization strategy indicator (RSI) 86 is included in the modified packet 46 as it is recorded as a track packet on storage medium 22.

As an example of how the randomization strategy indicator (RSI) 86 and seed reconfigurator 90 can operate, in the illustrative example of a magnetic tape drive the plural techniques reflected by the randomization strategy indicator (RSI) 86 can differ from one another by using a different concatenation of at least part of a track number corresponding to a destination physical track and at least part of a physical packet number corresponding to a destination physical packet location on the destination physical track. For example, a first strategy can use or concatenate a X1 number of bits of the track number corresponding to the destination physical track and X2 number of bits of the physical packet number corresponding to the destination physical packet location on the destination physical track; a second strategy can use or concatenate a Y1 number of bits of the track number corresponding to the destination physical track and Y2 number of bits of the physical packet number corresponding to the destination physical packet location on the destination physical track; and so forth. The different values of the different randomization strategy indicator (RSI) 86 thus result in yet different run length limited (RLL) encoded versions of the packet.

The randomization strategy indicator (RSI) 86 can have a value which depends on a reason for recording the packet on the storage medium. For example, the randomization strategy indicator can have a first value when the packet is recorded as a virgin packet (i.e., first time packet) and another value when the packet is recorded as a rewritten packet. As a further illustrative example, the randomization strategy indicator can have a second value when the packet is recorded as a normally rewritten packet; a third value when the packet is recorded as a fill packet when further data is not currently available; and, a fourth value when the device is in a mode of continuously rewriting the packet until it is successfully read.

Figure 8:
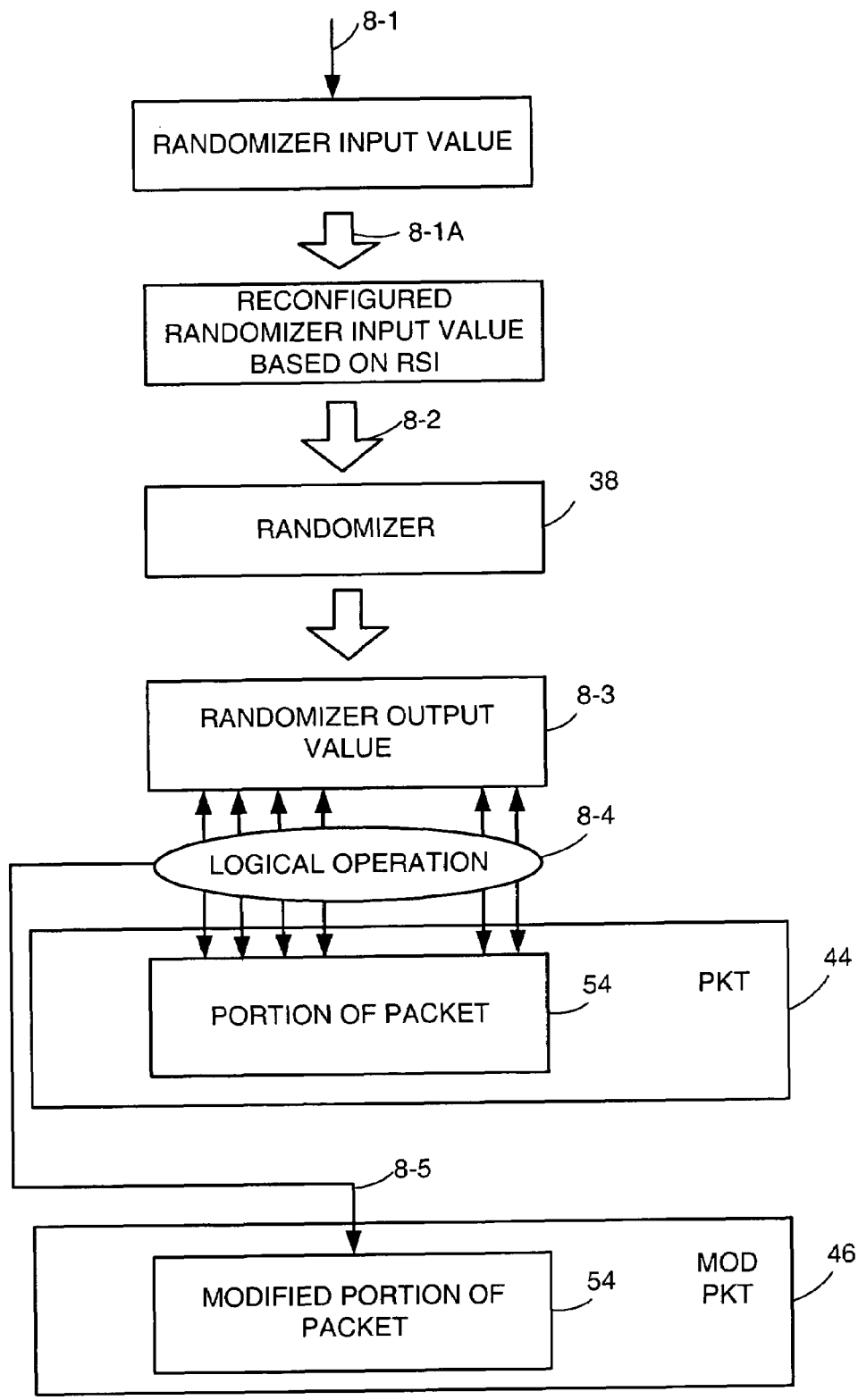
FIG. 8 is a diagrammatic view depicting various basic, representative steps of an example technique of for using a randomizer input value for generating a modified packet for the fourth example embodiment.

FIG. 8 shows basic, representative steps of an example technique of randomizer 38 using not only the randomizer input value 50, but also the randomization strategy indicator (RSI) 86 for generating a modified packet 46. The steps of FIG. 8 are comparable to those of FIG. 3, with similar events depicted by steps having like numbered suffixes. However, the technique of FIG. 8 differs by inclusion of step 8-1A in which the randomizer input value 50 is reconfigured or modified to derive another input value for randomizer 38.

Figure 9:
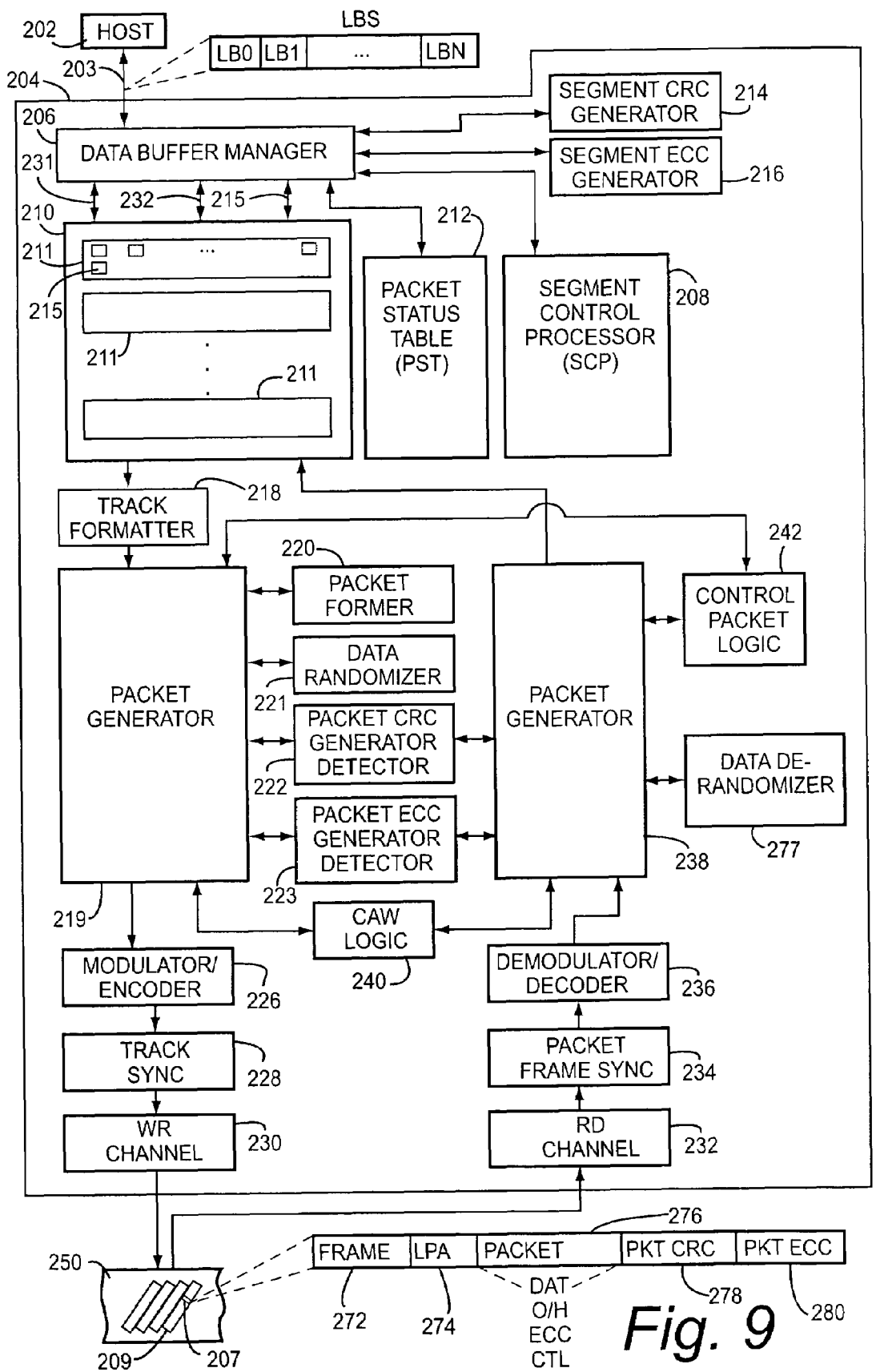
FIG. 9 is a schematic view of a data recording/recovery device according to a fifth example embodiment.

FIG. 9 illustrates a particular implementation in which the data recording/recovery device is a helical scan recorder of the general type disclosed, e.g., in U.S. Pat. No. 6,381,706 (incorporated herein by reference), but improved, e.g., according to the technology described herein. In the recording of data onto a storage medium 250, user data 203 is typically transferred to and from a recording/recovery device 204 by a host system 202 in variable length logical block sets. Each logical block set (LBS) is a collection of user data bytes that contain a variable number of logical blocks (LB0, LB1, ..., LBN). Each logical block (LB) is defined within its LBS by a unique logical block address (LBA).

LBS data 203 is partitioned into a number of fixed-sized data packets by a data buffer manager 206 and placed within a buffer packet 215 in a data buffer 210 until being transferred to the storage medium 250. When the time comes to record a buffer packet 215 or control packet onto the storage medium 250, track formatter 218 determines a target or destination physical location on storage medium 250 at which the packet is to be recorded.

The packet generator 219 then performs various operations. First, packet generator 219 prompts packet former 220 to form a packet using the user data acquired from buffer packet 215. Next, packet generator 219 invokes data randomizer 221 which functions like randomizer 38 of the embodiments previously described. Following, packet generator 219 causes packet CRC generator 222 to generate a packet cyclical redundancy code (CRC) over the packet and packet ECC generator 223 to generate a packet ECC over the packet and packet CRC.

In conjunction with the randomization, data randomizer 221 uses a randomizer input value obtained from track formatter 218 for modifying at least a portion of the packet so that the run length limited sequence of a resulting modified packet will differ from the nominal or initial sequence of ones and zeros which would have resulted from the nominal RLL sequence of the packet as input to packet generator 219. The data randomizer 221 uses the randomizer input value for modifying a run length limited sequence of at least a portion of the input packet to obtain modified packet. As in the previous example embodiments, the randomizer input value utilized by data randomizer 221 is related to a predetermined physical location on the storage medium, and preferably is the destination physical location.

The packet generator 219 formats the modified packet, packet CRC, and packet ECC, a logical packet address (LPA), and framing information into a track packet 207. The LPA comprises the address of the location of the packet in the segment 211. If the packet is a control packet, the LPA contains information pertaining to the type of control packet that it is. The track formatter 218 had previously determined where the formatted track packets 207 would be recorded onto tracks. A modulator/encoder 226 encodes and modulates the formatted track using, for example, a (0,6) Run Length Limited (RLL) channel modulation code into a 17-bit codeword. A track synchronization signal is added to each track by track synchronization signal generator 228, and the track is then sent to a write channel 230 to be recorded onto storage medium 250.

Track packets 207 are recorded onto storage medium 250 in tracks 209. Multiple track packets 207 exist on each track 209. In the illustrative embodiment, each track packet 207 is a fixed size and includes framing information 272, a local packet address field 274, a packet field 276, a packet CRC field 278, and a packet ECC field 280.

During a recovery session, track packets 207 are detected by read channel 232. A packet frame synchronizer 234 uses the framing information 272 to detect the leading edge of a track packet 207. Framing information 272 is a unique signal that is sent between track packets 207 in the channel domain to provide synchronization for track packet detection. This signal does not obey the run-length restriction of the channel modulation code and does not have a byte symbol associated with it, meaning that it is not decoded to a byte symbol by demodulator/decoder 236. In the illustrative embodiment, the packet framing signal is 19 bit cells long and is a 6,6,6.

The demodulator/decoder 236 demodulates and decodes the packet 207. A read logic manager uses the local packet address field 274 to first determine whether the track packet 207 contains a control packet. The handling of control packets is performed by control packet processor 242 (discussed hereinafter). If the track packet 207 does not contain a control packet, it contains either a data packet, an overhead packet, or a segment ECC packet. Packet read processor/manager 238 uses the local packet address 274 along with the current global segment address (discussed hereinafter with respect to control packets) to determine the correct location of the track packet in the buffer 210. Read logic manager 238, in conjunction with packet CRC generator/error detector 222, uses the packet CRC field 278 to detect whether track packet 207 contains any errors. If track packet 207 contains any errors, read logic manager 238, in conjunction with packet ECC generator/error corrector 223, uses the packet ECC field 280 to detect and correct track packet 207 errors. If the track packet 207 is good or has been corrected, read logic manager 38 extracts the contents of packet field 276, de-randomizes the content using data derandomizer 277, and sends it to it proper location in the buffer 210.

Control packets are generated during a recording session by a control packet processor 242, and contain information relating to the position of the media (such as beginning- or end-of-media), the beginning and or ending of files or data (e.g., filemarks, tapemarks, end-of-data marks), global address information (e.g., the global segment address of data surrounding the control packet), and system information (such as device control code). During a recording session, control packets are processed by control packet processor 242 to determine the position of the storage media and where to place recovered data packets, buffer overhead packets, and segment ECC packets in the data buffer.

Certain control packets are periodically placed along the tracks 209 of the storage medium 250 and contain a global segment address (GSA) 237. Control packet processor 242 extracts the global segment address 237 from these control packets and maintains the current global segment address 237 in local storage. The GSA 237 is used in concert with a local packet address (LPA) contained in the LPA field 274 of each track packet 207 to define the location of a packet in a segment 211 of the buffer 210.

The data buffer 210 is organized into 48 equal length segments 211. Each segment is a set of 1220 PACKETS (156,160 bytes). Each segment 211 is divided into two areas: (1) DATA/OVERHEAD AREA; 1024 PACKETS (128 KBytes, LBS data and overhead); and (2) ECC AREA; 196 PACKETS (24.5 Kbytes Redundancy for correcting DATA/OVERHEAD AREA). The Data/Overhead Area of each segment 211 is a set of 1024 PACKETS (128 Kbytes) arranged in a 32 by 32 array. The Data/Overhead Area is used to store the LBS data and SEGMENT overhead data. The overhead data packets locate the positions of where the LBS's end in the SEGMENT. Typically only one PACKET is used for overhead in a SEGMENT so there is 1023*128*48=6285312 bytes (~6.2 Mbytes) available best case in the buffer for LBS data.

An LBS is divided up into 128 byte PACKETS when stored in the buffer 210. These 128 byte elements of LBS data, when residing in the buffer 210, are referred to as SEGMENT DATA PACKETS. When the number of LBS bytes are not exactly divisible by 128, the last SEGMENT DATA PACKET of the LBS will be padded out to the end of the packet. Every LBS will start at the beginning of a SEGMENT DATA PACKET boundary and not more than one LBS will be put into a SEGMENT DATA PACKET. The last PACKET of the 32 by 32 section is the KEY OVERHEAD PACKET.

A TRACK PACKET is a 148 byte-long data element. The last 146 bytes of this group of data is then encoded with the modulation code, separated by PACKET FRAMING signals, and sent to the write channel 230 for recording. Table 1 describes each byte that makes up a TRACK PACKET.

TABLE 1

TRACK PACKET FORMAT

| PACKET ELEMENT | LABEL | WORD | CONTENTS |
|---|---|---|---|
| VIRTUAL PACKET ADDRESS | VPA | 0 | Extension to address that is not sent to tape |
| LOCAL PACKET ADDRESS | LPA | 1, 2, 3 | Defines type of PACKET, and where to locate in buffer |
| PACKET DATA | PKDATA | 4-67 | 128 bytes |
| PACKET CRC | PKCRC | 68, 69 | 4 byte Packet CRC |
| PACKET ECC Q, P | PKECCP | 70-73 | Reed-Solomon Redundancy |

The PACKET FRAMING SYNC signal is a unique signal that is sent between TRACK PACKETS in the channel domain to provide synchronization for TRACK PACKET detection. This signal does not obey the run-length restriction of the channel modulation code. The sync signal does not have a word symbol associated with it, meaning it is not decoded to a word symbol by the modulation decoder. This signal is 19 bit cells long and is a 6,6,6 pattern, the first bit is never checked on decode. Detection of the PACKET FRAMING SYNC signal enables Read Logic 238 to identify the start of a TRACK PACKET.

The VIRTUAL PACKET ADDRESS (VPA) is a 1 word field that is associated with a write session. Use of the VPA allows the read logic 238 to be able to reject good TRACK PACKETS from an older write session that are not intended to be read. These old TRACK PACKETS can exist and must be logically rejected. These packets can exist in the "bush" areas associated with speed changes, near the edge of tape due to interchange between drives and anywhere that the write head fails to overwrite an earlier session.

The VPA is included when calculating the CRC and Reed Solomon redundancy, but the VPA is not sent to the tape with the rest of the packet. Upon reading, the drive first "acquires" the VPA by using packet error correction on a number of packets to find the VPA. Then the drive uses the acquired VPA to preload its CRC and Reed Solomon Syndrome hardware so that only a packet with the correct VPA will be found as good. If a perfectly read packet from an old session (different VPA) appears, it is therefore rejected by the drive.

The LOCAL PACKET ADDRESS (LPA) is a 3 word field stored in words 1, 2, and 3 of the TRACK PACKET. The LPA field contain a packet address that spans multiple memory buffer segments, the current track number, the packet number on the track, two rewrite status bits, and two randomization status bits. The three LPA words do not reside in the BUFFER SEGMENT.

LPA words 0 (see FIG. 10A) and 2 (see FIG. 10C) indicate whether the PACKET is a Data/ECC PACKET or a CONTROL PACKET and, if a Data/ECC PACKET, it contains the BUFFER SEGMENT address for the PACKET. LPA word 1 (see FIG. 10B) contains the current track number when written. LPA word 2 contains the current packet number when written, starting at 0 and incrementing until the end of the track. LPA word 2 also contains the most significant bits of the RAM BUFFER address that starts in LPA word 0. The full LPA allows Data/ECC PACKETS to be located unambiguously in the correct BUFFER SEGMENT within 32 complete RAM BUFFERS (48 SEGMENTS each).

In conjunction with FIG. 10A-FIG. 10C, SEG[5:0]=SEGMENT number, 0 thru $2F_{16}$ only valid; when RAN=1, the packet data is randomized (an example of the aforementioned randomization activation flag (RAF) 72); RW[1:0]=Rewritten Packet Type (an example of the aforementioned randomization strategy indicator (RSI) 86); SE=Seed Enabled.

The full LOCAL PACKET ADDRESS is a 21 bit field that when combined with the 24 bit GLOBAL SEGMENT ADDRESS field will uniquely identify every Data/ECC PACKET location in a tape volume. The GLOBAL SEGMENT ADDRESS field is always sent in the body of CONTROL PACKETS. Three-fourths of this address range is available for LBS data. This fact, combined with the range of the GLOBAL SEGMENT ADDRESS, determines the amount of user data that can be uniquely addressed within the range of all PACKETS on a tape volume. While PACKETS spanning up to 48 BUFFER SEGMENTS may be present in one TRACK, CONTROL PACKETS' LOCAL and GLOBAL SEGMENT ADDRESS contents are always associated with the most recent SEGMENT's data packets in that track. The Write Logic never allows LOCAL PACKET ADDRESS numbers spanning more than 48 SEGMENTS to exist on tape within the same TRACK.

The PACKET DATA field for Data/ECC PACKETS is associated with a BUFFER PACKET location in the BUFFER SEGMENT. The PACKET DATA field for CONTROL PACKETS however comes from many sources.

Both Data/ECC PACKETS and CONTROL PACKETS can be randomized, e.g., by data randomizer 221, to reduce pattern sensitivity associated with user data. The RAN bit defines if randomization is enabled. A first randomization scheme exists for packets such as data and ECC packets; a second randomization scheme is for control packets.

If randomization is enabled for data and ECC packets, the RW[1:0] bits select 4 possible randomization methods. If randomization is enabled for control packets, two randomization methods are available. The randomized data field for both types of packets starts at word 4 and ends with word 67. The RAN bit is located in LPA fields for all packets. If RAN=0, randomization is not utilized, but if RAN=1, randomization is utilized.

The randomizer 221 uses an 18 bit LFSR (shift register) in which one bit is seeded with a "1" and the other 17 bits are seeded from various components of the LPA, depending on the value of randomization strategy indicator (RSI) 86, e.g., the value of the RW[1,0] bits as shown in Table 2 or the value of SE in Table 3. Seeding one bit with a "1" will ensure that the data randomizer 221 is never seeded with an "all zeros" case. The output of the randomizer 221 is preferably XOR'ed with the data word to generate a random data pattern.

TABLE 2

DATA/ECC PACKET RANDOMIZATION

| RW[1:0] | Randomization | Seed[16:0] |
|---|---|---|
| 00 | Randomized with Seed 1 | {TRACK_NUMBER[4:1], PHYSICAL_PACKET[2:0], LPA0 [9:0]} |
| 01 | Randomize with Seed 1 | {TRACK_NUMBER[3:1], PHYSICAL_PACKET[3:0], LPA0 [9:0]} |
| 10 | Randomize with Seed 2 | {TRACK_NUMBER[7:0], PHYSICAL_PACKET[8:0]} |
| 11 | Randomize with Seed 2 | {TRACK_NUMBER[7:0], PHYSICAL_PACKET[8:0]} |

TABLE 3

CONTROL PACKET RANDOMIZATION

| SE | Randomization | Seed[16:0] |
|---|---|---|
| 0 | Randomize with Seed 2 | {TRACK_NUMBER[7:0], PHYSICAL_PACKET[8:0]} |
| 1 | Randomize with CP SEED | {4'hA, CP_SEED[12:0]} |

Control packets are not rewritten and are always rewritten at a same packet location on every track. Because of these constraints, control packets do not benefit from location specific seed information as much as data packets. For this reason control packets have an alternative field, the CP SEED (see Table 3). In a first setting of the SE bit does not obtain the desired results, the second setting is provided. This feature is selectable by firmware as is the seed itself.

One example polynomial that can be utilized for data randomizer 221 is $$X[15]+X[13]X[12]+X[10]+X[8]+X[6]+X[4]+X[1]+X[0]$$

Data and ECC packets are can be rewritten from several sources. To aid system debugging, it is helpful to recognize the source of the rewrites. The RW[1:0] bits define the four possible rewrite sources. The RW[1:0] bits are as set forth in Table 4.

PACKETS are always recorded in their entirety; if a packet is not completely full when a write session ends, the packet is padded out. Specifically the remaining locations of the packet are filled with a firmware programmable pad value.

TABLE 4

DATA/ECC PACKET REWRITE DEFINITION

| Type | RW[1:0] | Rewrite Description |
|---|---|---|
| 0 | 00 | No rewrite, virgin packet |
| 1 | 01 | Normal, flunk rewrite |
| 2 | 10 | Bonus rewrite |
| 3 | 11 | Forced rewrite |

The RW[1:0] bits are also used to define the randomization seed as defined in the previous section. Normal rewritten packets come from the Check-After-Write process. When a packet is not read successfully, it is rewritten as a Type 1 rewrite packet. When a written track fails the flunk test criteria, the entire prior track is rewritten. This again produces type 1 rewrite packets.

Bonus rewrite packets are written when one or more packets need to be rewritten but not enough to fill a track, and there is no more new data from the host. Rather than write empty packets after the rewrite packets, bonus or redundant copies of the rewrite packets are written as type 2 rewrite packets.

The tape drive can perform a tape pause operation in the manner described in simultaneously-filed U.S. patent application Ser. No. 11/075,818, entitled "PAUSE STRATEGY FOR MAGNETIC TAPE RECORDING", which is incorporated by reference herein in its entirety.

As an added precaution, software has the capability to force a group of packets to be rewritten continuously until software validates that the rewritten packets have been successfully read. These packets are type 3 or forced rewrite packets.

Figure 11:
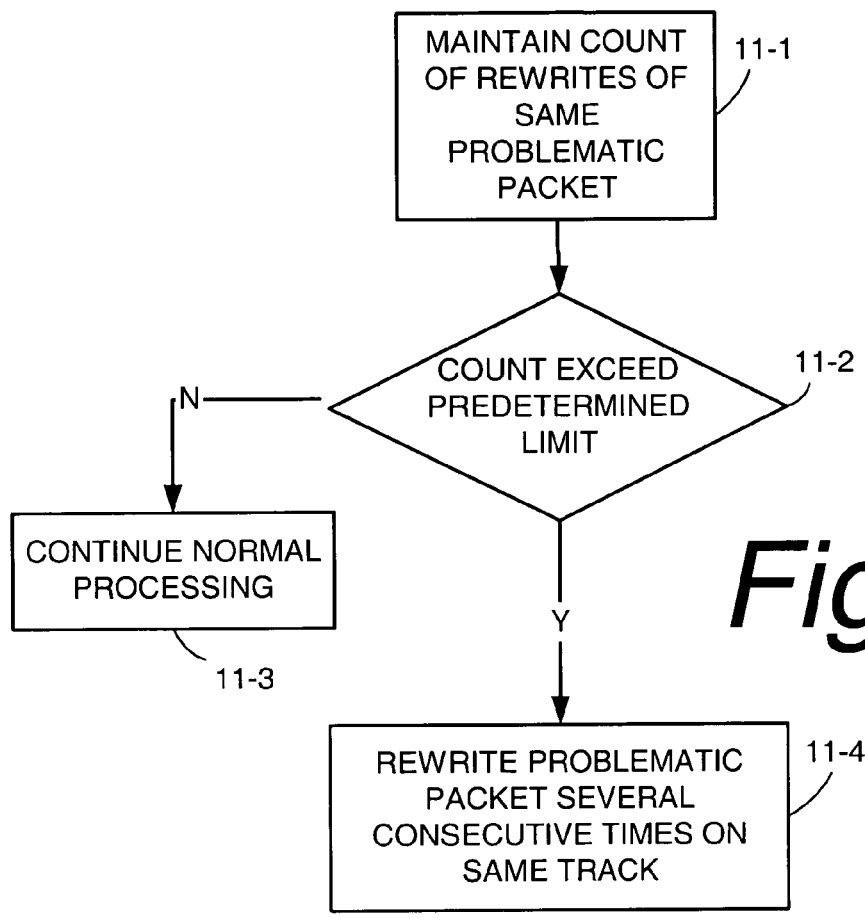
FIG. 11 is a flowchart depicting basic, example steps or actions performed in conjunction with a mode of recording a problematic packet at several consecutive positions on a same track.
Figure 12:
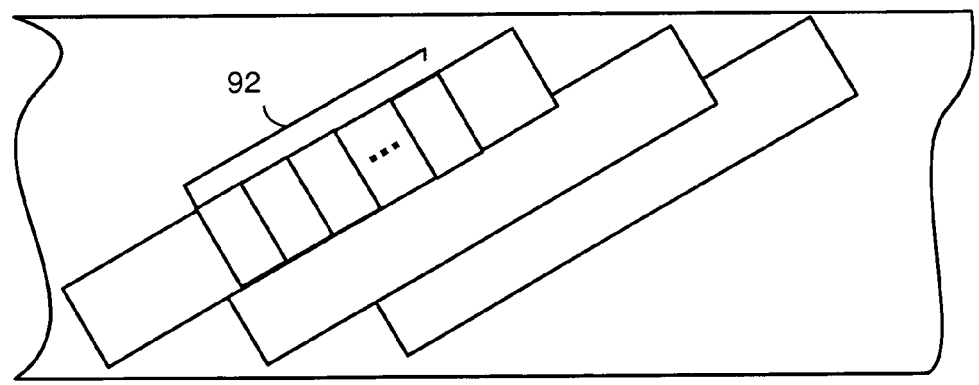
FIG. 12 is a diagrammatic view of a portion of magnetic tape for illustrating recording a problematic packet at several consecutive positions on a same track.

Thus, as one optional aspect, steps such as those basically illustrated in FIG. 11 can be performed. As step 11-1, a count is kept of how many times a packet has been rewritten. The count can be kept or maintained, for example, by check after write processor or functionality 240. As step 11-2, a determination is made if the count number exceeds a preprogrammed limit. If not, as step 11-3 regular check after write or other appropriate processing is resumed. If the preprogrammed limit is exceeded, as step 11-4 the problematic packet is subsequently rewritten on a single track several times in a row, as illustrated by repetitive packet series 92 in FIG. 12. Rewriting the problematic packet on a single track several times in a row increases the number of opportunities that the packet will be readable during check after write since the randomization seed will change for each of the packets written. Each packet has a different physical packet location number so each rewritten packet will have a different randomization seed. The number of times the packet is rewritten on a single track is programmable.

It should be understood that the foregoing consecutive rewrite strategy can also be utilized for other types of storage medium, so that the processor can write the same problematic packet to plural consecutive locations on the storage medium if the packet can not be recovered after a predetermined number of repeated recording attempts.

Described herein thus is, e.g., a rewrite methodology that effectively modifes the frequency content of the write signal each time a packet is written or recorded on the storage medium. This allows the system to rewrite the packet as many times as needed to find a pattern that passes the check after write (or read after write) process. This technology uses the check after write process as a feedback mechanism to modify a track packet to make the packet more likely recoverable on subsequent rewrites using positional information as a randomized seed.

Moreover, in another of its aspects, the technology described herein identifies problematic packets and increases the number of these rewritten packets on a single track (e.g., a forced rewrite) to provide greater probability that the packet will pass the check after write (CAW) process more quickly.

As described herein, a track packet represents a fundamental element recorded on the storage medium. Each track on the medium comprises a number of track packets, depending on the track format. Each track packet is assigned a physical track number and packet number that represents its physical location (either on the track or on the tape). For example, starting at track 0 and packet 0 and proceeding to track 0 and packet 1, and track 0 packet 2, etc. The next track would start with track 1, packet 0, followed by track 1, packet 2, etc. The physical location information is independent of the Local Packet Address (LPA) that is also included in the packet header.

The track packets that contain user data are constructed in the following manner: (1) Each packet is built containing a payload of user data from buffer memory and physical reference information; (2) the track packet is built from the data packet and passed through a randomizer function (38 or 221); (3) CRC and ECC redundancy symbols are calculated and appended to form the full track packet; and (4) the track packet is then encoded using an encoder (e.g., a 16/17 encoder) and sent to the write channel for recording.

The frequency content of the packet is controlled by the randomizer 38. the randomizer 38 can take the form of a pseudorandom number generator that requires a seed from which to start the random number sequence. Depending on the seed input, the randomization output will be different. Hence, changing the seed results in changing the frequency content of the downstream write signal.

In an illustrated embodiment, a portion of the physical track and packet number is used as the seed for the randomizer 38. The result is that, every time a packet is rewritten to the storage medium, it has a different seed since the physical location information is different from when it was last written.

The RLL encoder utilized can be essentially any type of RLL data encoder, including a RLL type encoder which has its own randomizer.

In another aspect of this technology, the system keeps track of how many times a packet has been rewritten. When this number exceeds a preprogrammed limit, the problematic packet is subsequently rewritten on a single track several times in a row. this increases the number of opportunities that the packet will be readable during check after write since the randomization seed will change for each of the packets written. Each packet has a different physical packet location number so each rewritten packet will have a different randomization seed. The number of times the packet is rewritten on a single track is programmable.

The foregoing technology helps expedite getting the packet to pass the check after write process and avoid a drive performance issue. The issues results from not being able to release the problematic packet location for use by the host for new data. Specifically, a problematic packet can hold up releasing an entire segment and ultimately, the entire buffer if it fails to pass the check after write test multiple times.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A data recording/recovery method comprising:
using a first randomizer input value for converting a packet to a modified packet;
recording the modified packet at a first destination on the storage medium;
performing a check-after-write procedure for attempting to recover the modified packet from the storage medium;
when the modified packet as recovered from the storage medium fails to pass the check-after-write procedure, using a second randomizer input value for converting the packet to a second modified packet, the second randomizer input value being different than the first randomizer input value;

recording the second modified packet at a second destination on the storage medium, the second destination being different from the first destination;

establishing plural randomization strategy techniques, forming the first randomizer input value according to a first randomization strategy technique;

recording the modified packet including a value of the randomization strategy indicator indicative of the first randomization strategy technique at the first destination on the storage medium;

using the randomization strategy indicator for the modified packet as read from the modified packet in the check after write procedure for de-randomizing the modified packet;

forming the second randomizer input value according to a second randomization strategy technique, second randomization strategy technique being different than the first randomization strategy technique;

recording the second modified packet including a value of the randomization strategy indicator indicative of the second randomization strategy technique at the second destination on the storage medium.

2. The method of claim 1, further comprising performing the check-after-write procedure for attempting to recover the second modified packet from the storage medium;

if the second modified packet as recovered from the storage medium fails to pass the check-after-write procedure, using a third randomizer input value for converting the packet to a third modified packet, the third randomizer input value being different than the first randomizer input value and the second randomizer input value;

recording the third modified packet at a third destination on the storage medium, the third destination being different than the second destination being and the first destination.

3. The method of claim 1, further comprising forming at least one of the first randomizer input value and the second randomizer input value to have a relation to a physical destination of a respective modified packet on the storage medium.

4. The method of claim 3, wherein the destination physical location is at least partially related to a destination track location on the storage medium and is at least partially related to a destination packet location on the track.

5. The method of claim 1, wherein the first modified packet when encoded at least partially comprises a first run length limited sequence which is different than a nominal run length limited sequence; and wherein the second modified packet when encoded at least partially has a second run length limited sequence which is different than the first run length limited sequence and the nominal run length limited sequence.

6. The method of claim 1, further comprising forming the first randomizer input value at least partially to have a relation to a logical packet address of the packet in a packet data buffer.

7. The method of claim 6, further comprising forming the first randomizer input value also to have a relation to a track number corresponding to a destination physical track for the modified packet on the storage medium and a relation to a physical packet number corresponding to a destination physical location for the modified packet on the destination physical track.

8. The method of claim 7, further comprising forming the first randomizer input value to comprise a concatenation of at least a portion of the logical packet address of the packet in a packet data buffer, the track number, and the physical packet number.

9. The method of claim 1, wherein the plural randomization strategy techniques differ at least by forming the respective randomizer input values using different concatenations of (1) a number which is related to a destination track on the storage medium; and (2) a number which is related to a destination packet location on the destination track.

10. The method of claim 1, wherein each destination is specified at least in part by plural location descriptors including a first location descriptor and a second location descriptor, wherein according to the first randomization strategy technique the first randomizer input value comprises a concatenation comprising a first unique combination of numbers of bits for a first location descriptor for the first destination physical location and a second location descriptor for the first destination physical location; and wherein to the according to the second randomization strategy technique the second randomizer input value comprises a concatenation comprising a second unique combination of numbers of bits for a first location descriptor for the second destination physical location and a second location descriptor for the second destination physical location.

11. A data recording/recovery device comprising:

a packet generator for including recordable information into a packet;

a randomizer configured to use a first randomizer input value to convert a packet to a modified packet;

a write channel configured to record the modified packet at a first destination on the storage medium;

a check-after-write processor configured to perform a check-after-write procedure for attempting to recover the modified packet from the storage medium;

wherein, if the modified packet as recovered from the storage medium fails to pass the check-after-write procedure, the randomizer is configured to use a second randomizer input value to convert the packet to a second modified packet; and wherein the write channel is configured to record the second modified packet at a second destination on the storage medium, the second destination being different than the first destination;

wherein the randomizer is configured to form the first randomizer input value according to a first randomization strategy technique from plural randomization strategy techniques;

wherein the write channel is configured to record the modified packet including a value of the randomization strategy indicator indicative of the first randomization strategy technique at the first destination on the storage medium;

wherein the check after write processor is configured to use the randomization strategy indicator for the modified packet as read from the modified packet in the check after write procedure for de-randomizing the modified packet;

wherein the randomizer is configured to form the second randomizer input value according to a second randomization strategy technique, second randomization strategy technique being different than the first randomization strategy technique;

wherein the write channel is configured to record the second modified packet including a value of the randomization strategy indicator indicative of the second randomization strategy technique at the second destination on the storage medium.

12. The apparatus of claim 11, further comprising wherein the check-after-write processor is configured to attempt to recover the second modified packet from the storage medium;

wherein, if the second modified packet as recovered from the storage medium fails to pass the check-after-write procedure, the randomizer is configured to use a third randomizer input value to convert the packet to a third modified packet, the third randomizer input value being different than the first randomizer input value and the second randomizer input value;

wherein the write channel is further configured to record the third modified packet at a third destination on the storage medium, the third destination being different than the second destination being and the first destination.

13. The apparatus of claim 3, wherein the destination physical location is at least partially related to a destination track location on the storage medium and is at least partially related to a destination packet location on the track.

14. The apparatus of claim 11, wherein the randomizer is configured to form at least one of the first randomizer input value and the second randomizer input value to have a relation to a physical destination of a respective modified packet on the storage medium.

15. The apparatus of claim 11, wherein the first modified packet when encoded at least partially comprises a first run length limited sequence which is different than a nominal run length limited sequence; and wherein the second modified packet when encoded at least partially has a second run length limited sequence which is different than the first run length limited sequence and the nominal run length limited sequence.

16. The apparatus of claim 11, wherein the randomizer is configured to form the first randomizer input value at least partially to have a relation to a logical packet address of the packet in a packet data buffer.

17. The apparatus of claim 16, wherein the randomizer is configured to form the first randomizer input value also to have a relation to a track number corresponding to a destination physical track for the modified packet on the storage medium and a relation to a physical packet number corresponding to a destination physical location for the modified packet on the destination physical track.

18. The apparatus of claim 17, wherein the randomizer is configured to form the first randomizer input value to comprise a concatenation of at least a portion of the logical packet address of the packet in a packet data buffer, the track number, and the physical packet number.

19. The apparatus of claim 11, wherein the plural randomization strategy techniques differ at least by forming the respective randomizer input values using different concatenations of (1) a number which is related to a destination track on the storage medium; and (2) a number which is related to a destination packet location on the destination track.

20. The apparatus of claim 11, wherein each destination is specified at least in part by plural location descriptors including a first location descriptor and a second location descriptor, wherein according to the first randomization strategy technique the first randomizer input value comprises a concatenation comprising a first unique combination of numbers of bits for a first location descriptor for the first destination physical location and a second location descriptor for the first destination physical location; and wherein to the according to the second randomization strategy technique the second randomizer input value comprises a concatenation comprising a second unique combination of numbers of bits for a first location descriptor for the second destination physical location and a second location descriptor for the second destination physical location.

* * * * *